(12) United States Patent
Sugumar et al.

(10) Patent No.: US 11,553,340 B2
(45) Date of Patent: Jan. 10, 2023

(54) NETWORK IDENTIFIER AND AUTHENTICATION INFORMATION GENERATION FOR BUILDING AUTOMATION SYSTEM CONTROLLERS

(71) Applicant: Carrier Corporation, Palm Beach Gardens, FL (US)

(72) Inventors: Mohan Sugumar, Tamilnadu (IN); Rohitkumar Gordhanbhai Savaliya, Vadodara (IN); Saurav Girepunje, Abhanpur (IN)

(73) Assignee: Carrier Corporation, Palm Beach Gardens, FL (US)

( * ) Notice: Subject to any disclaimer, the term of this patent is extended or adjusted under 35 U.S.C. 154(b) by 78 days.

(21) Appl. No.: 17/128,842

(22) Filed: Dec. 21, 2020

(65) Prior Publication Data
US 2021/0282010 A1    Sep. 9, 2021

(30) Foreign Application Priority Data

Mar. 9, 2020 (IN) .............................. 202011010192

(51) Int. Cl.
| | | |
|---|---|---|
| *G06F 7/04* | (2006.01) | |
| *H04W 12/06* | (2021.01) | |
| *H04W 12/69* | (2021.01) | |
| *H04W 12/03* | (2021.01) | |
| *H04L 9/32* | (2006.01) | |
| *H04W 80/02* | (2009.01) | |

(52) U.S. Cl.
CPC ........... *H04W 12/06* (2013.01); *H04L 9/3236* (2013.01); *H04W 12/03* (2021.01); *H04W 12/69* (2021.01); *H04W 80/02* (2013.01)

(58) Field of Classification Search
CPC ..... H04W 12/06; H04W 12/03; H04W 12/69; H04W 80/02; H04L 9/3236

USPC .............................................. 726/2; 370/338
See application file for complete search history.

(56) References Cited

U.S. PATENT DOCUMENTS

| | | |
|---|---|---|
| 6,629,246 B1 | 9/2003 | Gadi |
| 6,742,129 B1 | 5/2004 | Higgs et al. |
| 6,996,714 B1 | 2/2006 | Halasz et al. |
| 7,058,180 B2 | 6/2006 | Ferchichi et al. |
| 7,321,972 B2 | 1/2008 | Isaacson et al. |
| 7,400,722 B2 | 7/2008 | Oi et al. |

(Continued)

FOREIGN PATENT DOCUMENTS

| | | |
|---|---|---|
| EP | 1552664 B1 | 8/2008 |
| WO | WO 2014035606 A1 | 3/2014 |
| WO | WO 2015005542 A1 | 1/2015 |

OTHER PUBLICATIONS

Peacock, M., "An analysis of security issues in building automation systems," Conference Paper, Dec. 2014.

(Continued)

*Primary Examiner* — Jeffrey C Pwu
*Assistant Examiner* — Samuel Ambaye
(74) *Attorney, Agent, or Firm* — Kinney & Lange, P.A.

(57) ABSTRACT

Generating network identifier information and authentication information for wireless communication with a controller includes accessing, by the controller, identity information associated with the controller. The controller obfuscates the identity information and generates the network identifier information and the authentication information associated with the controller using the obfuscated identity information. The controller is configured for wireless communication using the generated network identifier information and the generated authentication information.

19 Claims, 7 Drawing Sheets

(56) References Cited

U.S. PATENT DOCUMENTS

| | | |
|---|---|---|
| 7,634,555 B1 | 12/2009 | Wainscott, Jr. et al. |
| 7,636,338 B1 * | 12/2009 | Vu .................... H04W 12/08 |
| | | 455/420 |
| 8,024,306 B2 | 9/2011 | Palliyil et al. |
| 8,126,145 B1 | 2/2012 | Tewari et al. |
| 8,174,412 B2 | 5/2012 | Reddy et al. |
| 8,209,541 B2 | 6/2012 | Deutschmann et al. |
| 8,832,777 B2 | 9/2014 | Raleigh et al. |
| 8,914,641 B2 | 12/2014 | Gopal et al. |
| 8,938,785 B2 | 1/2015 | Coughlin et al. |
| 9,467,456 B2 | 10/2016 | Huang et al. |
| 9,813,382 B2 | 11/2017 | Agrawal et al. |
| 9,971,327 B2 | 5/2018 | Narain et al. |
| 10,314,046 B2 | 6/2019 | Chamarti |
| 10,417,451 B2 | 9/2019 | Park et al. |
| 10,420,156 B2 | 9/2019 | Shinozaki et al. |
| 2004/0025026 A1 | 2/2004 | Karp et al. |
| 2008/0072301 A1 | 3/2008 | Chia et al. |
| 2016/0359628 A1 | 12/2016 | Singh et al. |
| 2018/0109876 A1 | 4/2018 | Suyama et al. |
| 2018/0139792 A1 * | 5/2018 | Shinozaki ......... H04W 52/0216 |
| 2019/0163896 A1 | 5/2019 | Balaraman et al. |
| 2019/0260590 A1 | 8/2019 | Kuenzi |

OTHER PUBLICATIONS

Sterling Grah, J., "Hash Functions in Cryptography," Universitet i Bergen, Jun. 1, 2008.
Extended European Search Report for European Patent Application No. 20214252.7, dated Jun. 1, 2021, 9 pages.

* cited by examiner

NETWORK IDENTIFIER AND AUTHENTICATION INFORMATION GENERATION FOR BUILDING AUTOMATION SYSTEM CONTROLLERS

BACKGROUND

The present disclosure relates generally to wireless communication systems, and more specifically to the generation of network identity and authentication information for wireless communication in building automation systems.

Building automation systems (BAS) are used to manage and automate the control of various environmental, physical, and electrical building subsystems. In particular, BAS systems are often used for the coordination and control of heating, ventilation and air conditioning (HVAC) and climate control systems, but are also frequently used for security systems, lighting systems, and other connected building subsystems.

BAS systems typically leverage a series of interconnected controller devices that coordinate the control and automation of such subsystems. Large-scale BAS systems can include hundreds, or even thousands of controllers. Modern BAS systems often utilize wireless communication for data transmissions between controllers and with respective subsystem components.

Configuration of the BAS controllers for wireless communication, however, typically requires a team of service engineers to physically connect with each BAS controller (e.g., using a wired Ethernet or other wired connection) via a laptop or other computer device to initialize each BAS controller with, for example, a service set identifier (SSID) and password that is used for wireless communication and further commissioning of the controllers. Accordingly, conventional techniques for configuring BAS controllers for wireless communication often require a significant outlay of service engineering resources, thereby increasing the time and expense associated with the installation and maintenance of BAS systems.

SUMMARY

In one example, a method for generating network identifier information and authentication information for wireless communication with a controller includes accessing, by the controller, identity information associated with the controller. The method further includes obfuscating, by the controller, the identity information to produce obfuscated identity information associated with the controller, and generating, by the controller, the network identifier information and the authentication information associated with the controller using the obfuscated identity information. The method further includes configuring the controller for wireless communication using the generated network identifier information and the generated authentication information.

In another example, a method for generating network identifier information and authentication information for wireless communication with a controller includes receiving, by a computing device via wireless communication, identity information associated with the controller. The method further includes obfuscating, by the computing device, the identity information to produce obfuscated identity information associated with the controller, and generating, by the computing device, the network identifier information and the authentication information associated with the controller using the obfuscated identity information. The method further includes transmitting, by the computing device via the wireless communication, a request for initiating a wireless communication session between the computing device and the controller, the request including the generated network identifier information and the generated authentication information associated with the controller.

In another example, a controller device includes a wireless communication interface, one or more processors, and computer-readable memory. The computer-readable memory is encoded with instructions that, when executed by the one or more processors, cause the controller device to access identity information associated with the controller device, and obfuscate the identity information to produce obfuscated identity information associated with the controller device. The computer-readable memory is further encoded with instructions that, when executed by the one or more processors, cause the controller device to generate network identifier information and authentication information associated with the controller device using the obfuscated identity information, and configure the wireless communication interface for a wireless communication session using the generated network identifier information and the generated authentication information.

DETAILED DESCRIPTION

According to techniques of this disclosure, building automation system (BAS) controllers are configured for wireless communication using network identifier information, such as a service set identifier (SSID), and authentication information (e.g., a password) that are derived from obfuscated identity information of the respective controller. As described herein, a BAS controller accesses identity information associated with the controller, such as a media access control (MAC) address, and obfuscates the identity information using, e.g., a cryptographic hash function or other obfuscation technique. The controller generates the network identifier information (e.g., SSID) and authentication information (e.g., password) using the obfuscated identity information, and configures a wireless interface of the controller for wireless communication using the generated network identifier and authentication information.

Wireless communication is initiated with a remote computing device, such as a laptop or smartphone, utilized by, e.g., a service engineer for commissioning of the controller. The remote computing device executes an application or other software routine that generates the obfuscated identity information of the controller via corresponding (e.g., same) obfuscation operations. The remote computing device further determines the network identity information (e.g., SSID) and authentication information (e.g., password) using corresponding operations (i.e., corresponding to the operations utilized by the BAS controller) to produce the network identity and authentication information associated with the BAS controller. The service engineer or other personnel can access the application on the remote computing device via security logon credentials (e.g., a username and password, or other security credentials) to enhance security of the operations.

As such, the remote computing device can initiate a wireless communication session with the BAS controller using the generated network identity information and authentication information without requiring a wired connection (e.g., wired Ethernet or other wired connection) with the BAS controller for initial configuration. The techniques of this disclosure can therefore decrease the time and associated cost for installation and commissioning of a BAS system.

Figure 1:
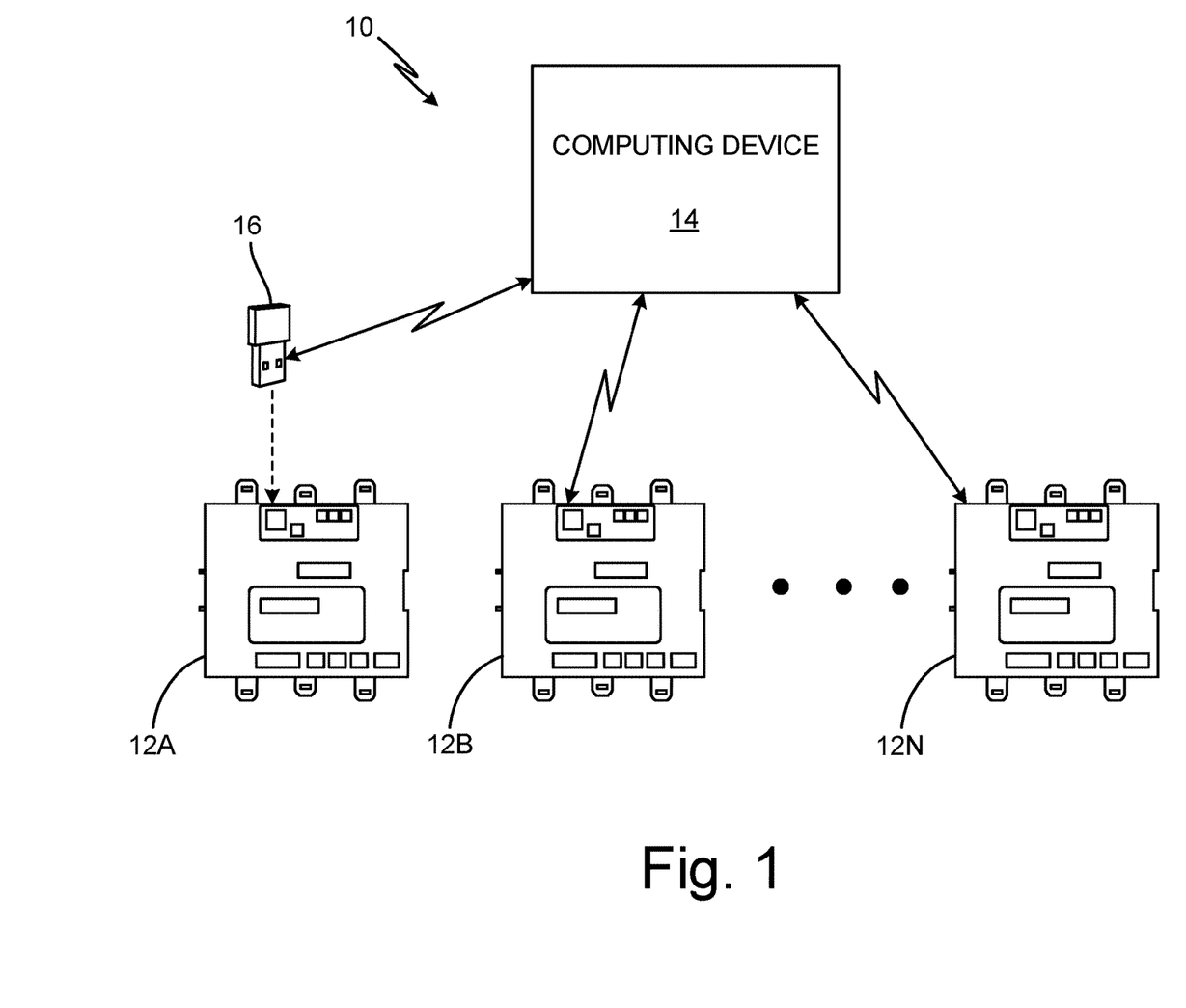
FIG. 1 is a block diagram illustrating an example building automation system (BAS) including controller devices and a remote computing device that can communicate wirelessly with the controller devices for initial configuration and commissioning of the BAS system.

FIG. 1 is a block diagram illustrating BAS system 10 including BAS controllers 12A-12N. As illustrated in FIG. 1, BAS system 10 can further involve remote computing device 14 that can communicate wirelessly with BAS controllers 12A-12N for configuration and commissioning operations.

In the example of FIG. 1, BAS controller 12A utilizes wireless communication adapter 16 that can be inserted into, e.g., a Universal Serial Bus (USB) port or other input/output (I/O) port of controller 12A for wireless communication with computing device 14 or other components of BAS system 10. Though in the example of FIG. 1, BAS controller 12A is illustrated and described as utilizing wireless communication adapter 16 while BAS controllers 12B-12N utilize built-in wireless transceivers, it should be understood that any one or more of BAS controllers 12A-12N can utilize a wireless communication adapter for implementing wireless communication. Similarly, in certain examples, each of BAS controllers 12A-12N can utilize a built-in wireless transceiver for wireless communication, such that none of BAS controllers 12A-12N utilizes a wireless communication adapter, such as wireless communication adapter 16. In addition, though the example of FIG. 1 is illustrated as including three separate BAS controllers, i.e., BAS controllers 12A, 12B, and 12N, it should be understood that the reference character "N" represents an arbitrary number, such that BAS system 10 can include any one or more BAS controllers, such as one BAS controller, two BAS controllers, or three or more BAS controllers 12A-12N.

Each of BAS controllers 12A-12N can be electrically and/or communicatively coupled with one or more BAS subsystems and/or components (not illustrated), such as heating, ventilation and air conditioning (HVAC) components, security system components, lighting system components, or other building subsystems and/or components. Computing device 14, as illustrated in FIG. 1, is remote from (i.e., physical remote from) BAS controllers 12A-12N and communicates wirelessly with BAS controllers 12A-12N for configuration and commissioning operations. Examples of computing device 14 can include, but are not limited to, a portable or mobile device such as a laptop computer, a tablet computer, a smartphone, a personal digital assistant (PDA), or a non-portable computing device such as a desktop computer.

In operation, each of BAS controllers 12A-12N generates network identifier information and authentication information for wireless communication with the respective one of BAS controllers 12A-12N. For example, as is further described below, each of BAS controllers 12A-12N accesses identity information associated with the respective one of BAS controllers 12A-12N. The identity information can be, e.g., a MAC address of the respective one of BAS controllers 12A-12N, a MAC address of a wireless transceiver of the respective one of BAS controllers 12A-12N, a MAC address of a wireless communication adapter associated with (e.g., connected with) the respective one of BAS controllers 12A-12N (e.g., wireless communication adapter 16 connected to BAS controller 12A), or other identity information (e.g., identity information that uniquely identifies the respective one of BAS controllers 12A-12N).

BAS controllers 12A-12N obfuscate the corresponding identity information using, for example, a cryptographic hash function or other obfuscation technique to produce obfuscated identity information associated with the corresponding one of BAS controllers 12A-12N. BAS controllers 12A-12N generate network identifier information (e.g., an SSID) and authentication information (e.g., a password) using the obfuscated identity information, as is further described below. Each of BAS controllers 12A-12N configures a wireless interface for wireless communication using the generated network identifier information and authentication information. For instance, each of BAS controllers 12A-12N can broadcast the generated network identifier information (e.g., SSID) and the identity information used to generate the network identifier information (e.g., MAC address) for initiation of a wireless communication session.

Computing device 14, which can be utilized by a service engineer or other technician for the configuration and commissioning of BAS controllers 12A-12N, can wirelessly receive the broadcasted network identifier information and identity information corresponding to one or more of BAS controllers 12A-12N. As is further described below, computing device 14 can execute an application or other software routine that performs corresponding obfuscation and network identifier and authentication information operations to produce network identifier and authentication information that corresponds to (e.g., matches) the network identifier and authentication information produced by each respective one of BAS controllers 12A-12N for wireless communication.

As an example, BAS controller 12A can obfuscate identity information associated with BAS controller 12A (e.g., a MAC address of BAS controller 12A) using a cryptographic hash function, such as the MD5 message-digest algorithm, the SHA-256 Secure Hash Algorithm, the SHA-512 Secure Hash Algorithm, the PBKDF2 Password-Based Key Derivation Function 2 algorithm, or other cryptographic algorithm known in the art, to produce obfuscated identity information associated with BAS controller 12A. BAS controller 12A can produce network identifier information and authentication information based on the obfuscated identity information, as is further described below. BAS controller 12A can configure a wireless interface for wireless communication using the network identifier information and authentication information.

Computing device 14 can receive the network identifier information (e.g., SSID) and identity information (e.g., the MAC address of BAS controller 12A) broadcasted by BAS controller 12A. Computing device 14 can execute an application or other software routine that obfuscates the received identity information using a corresponding (e.g., same) hash function or other cryptographic algorithm as was utilized by BAS controller 12A to produce obfuscated identity information that corresponds to (e.g., matches) the obfuscated identity information produced by BAS controller 12A. Computing device 14 can further perform corresponding (e.g., same) network identifier and authentication information operations to produce network identifier and authentication information that corresponds to (e.g., matches) the network identifier and authentication information produced by BAS controller 12A.

Computing device 14 can wirelessly transmit a request for initiating a wireless communication session between computing device 14 and BAS controller 12A. The request can include the network identifier information (e.g., SSID) and authentication information (e.g., password) that was generated using the obfuscated identity information associated with BAS controller 12A. BAS controller 12A, in response to determining that network identity information and authentication information received in the request matches the network identity information and authentication information produced by BAS controller 12A, can initiate the communication session with computing device 14.

Accordingly, computing device 14 can communicate wirelessly with BAS controller 12A without requiring a wired connection for the initialization and configuration of wireless communications. The techniques of this disclosure can therefore decrease the number of service engineers and technicians (and the corresponding number of work-hours) required to configure and commission a BAS system. As such, the techniques described herein can decrease the total cost associated with BAS systems, thereby increasing feasibility of installation and promoting the use of BAS systems for building subsystem management.

Figure 2:
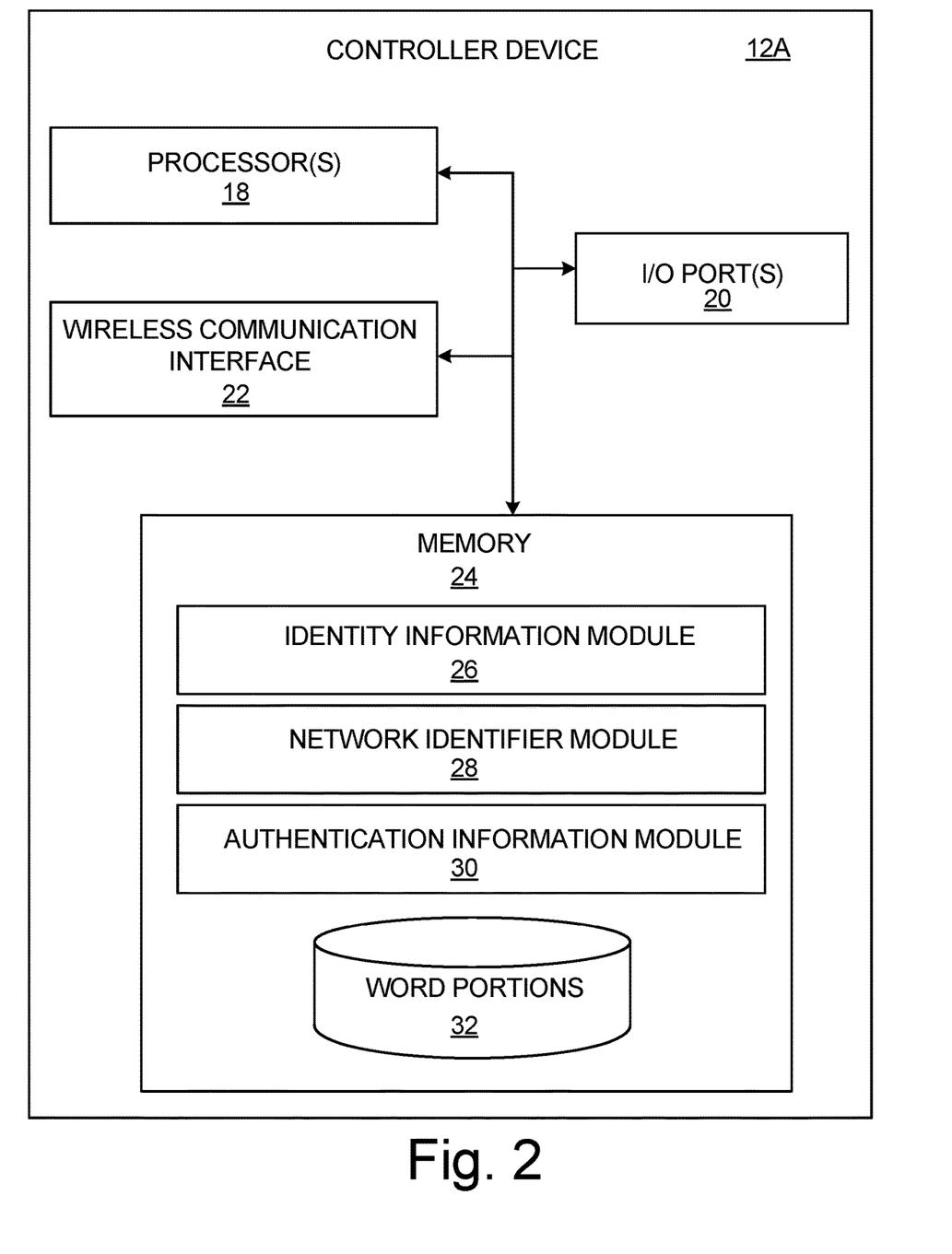
FIG. 2 is a block diagram illustrating further details of a BAS controller device of FIG. 1.

FIG. 2 is a block diagram illustrating further details of BAS controller 12A of FIG. 1. Though the example of FIG. 2 is described below with respect to BAS controller 12A, it should be understood that the techniques described below are applicable to any one or more of BAS controllers 12A-12N (FIG. 1).

As illustrated in FIG. 2, BAS controller 12A includes one or more processors 18, one or more input/output (I/O) ports 20, wireless communication interface 22, and computer-readable memory 24. Computer-readable memory 24, as illustrated in FIG. 2, can store identity information module 26, network identifier module 28, authentication information module 30, and word portions 32.

Processor 18 can be configured to implement functionality and/or process instructions for execution within BAS controller 12A. For instance, processor 18 can be capable of processing instructions stored in computer-readable memory 24, such as computer-readable instructions associated herein with identity information module 26, network identifier module 28, and authentication information module 30. Examples of processor 18 can include any one or more of a microprocessor, a digital signal processor (DSP), an application specific integrated circuit (ASIC), a field-programmable gate array (FPGA), or other equivalent discrete or integrated logic circuitry.

BAS controller 12A can utilize I/O ports 20 for interfacing with one or more peripheral devices. For instance, I/O ports 20 can include USB ports, serial communication ports, High-Definition Multimedia Interface (HDMI), or other analog or digital input/output interface ports. Wireless communication interface 22 can include any one or more of a software, firmware, or hardware interface for wireless communications. Such wireless communications can include, e.g., wireless Ethernet communications, Bluetooth communications, cellular communications such as 3G, 4G, and/or 5G communications, or other wireless communications. In some examples, wireless communication interface 22 can take the form of a wireless network card or other wireless transceiver that is configurable for wireless communications using network identity and authentication information determined by BAS controller 12A, as is further described below.

Computer-readable memory 24 can be configured to store information within BAS controller 12A during operation. In some examples, computer-readable memory 24 can include non-transitory memory. The term "non-transitory" can indicate that the storage medium is not embodied in a carrier wave or a propagated signal. In certain examples, non-transitory memory can store data that can, over time, change (e.g., in RAM or cache).

In some examples, computer-readable memory 24 can include volatile memory elements that do not maintain stored contents when electrical power to BAS controller 12A is removed. Examples of volatile memory elements can include random access memories (RAM), dynamic random access memories (DRAM), static random access memories (SRAM), and other forms of volatile memories. In certain examples, computer-readable memory 24 can include non-volatile memory elements configured for long-term storage of information. Examples of such non-volatile memory elements can include, e.g., magnetic hard discs, optical discs, flash memories, or forms of electrically programmable memories (EPROM) or electrically erasable and programmable (EEPROM) memories.

As illustrated in FIG. 2, computer-readable memory 24 can include identity information module 26, network identifier module 28, authentication information module 30, and word portions 32. Word portions 32, as is further described below, can store various textual or alphanumeric strings that can be utilized by BAS controller 12A for producing one or more of network identity information and authentication information for wireless communications with BAS controller 12A.

Identity information module 26, network identifier module 28, and authentication information module 30 can take the form of computer-readable instructions that, when executed by processor 18, cause BAS controller 12A to implement functionality attributed herein to identity information module 26, network identifier module 28, and authentication module 30. Though the example of FIG. 2 is described with respect to separate modules 26, 28, and 30, it should be understood that the techniques described herein with respect to such modules 26, 28, and 30 can be implemented in a single module, two modules, three modules, or more than three modules that distribute functionality attributed herein to modules 26, 28, and 30 among the multiple modules. In general, computer-readable memory 24 can store computer-readable instructions that, when executed by processor 18, cause BAS controller 12A to operate in accordance with techniques described herein.

In operation, BAS controller 12A determines network identity and authentication information that is derived from obfuscated identity information associated with BAS controller 12A. For example, BAS controller 12A can execute identity information module 26 to access identity information associated with BAS controller 12A. Such identity information can include, e.g., a MAC address of BAS controller 12A, a MAC address of a wireless transceiver associated with BAS controller 12A (e.g., a wireless transceiver of wireless communication interface 22), a MAC address of a wireless adapter associated with BAS controller 12A (e.g., a wireless communication adapter connected with BAS controller 12A via I/O ports 20), or other identity information. Identity information module 26 obfuscates the identity information, such as by using a cryptographic hash function or other obfuscation technique.

BAS controller 12A, as is further described below, executes network identifier module 28 to generate network identifier information using the obfuscated identity information. BAS controller 12A further executes authentication information module 30 to generate authentication information using the obfuscated identity information.

In certain examples, as is further described below, BAS controller 12A can determine one or more of the network identifier information and the authentication information as a combination (e.g., a concatenation) of a word portion and a numeric portion. In such examples, BAS controller 12A can access stored word portions 32, which can take the form of a table, an array, a matrix, a list, a linked list, a database, or other data structure configured to store data in an organized manner for later retrieval.

BAS controller 12A configures wireless communication interface 22 for wireless communication using the generated network identifier information and the generated authentication information. In response to receiving a request from a remote computing device for initiating a wireless communication session that includes the network identifier information and the authentication information, BAS controller 12A initiates the wireless communication session and communicates wirelessly with the remote computing device via the initiated session.

Accordingly, BAS controller 12A can generate network identifier information and authentication information based on obfuscated identity information associated with BAS controller 12A. As such, BAS controller 12A can automatically provide identifier information, such as an SSID, and authentication information, such as a password, that can be used for wireless communications with BAS controller 12A without requiring a wired connection for initializing or otherwise providing the network identifier and authentication information to BAS controller 12A.

Figure 3:
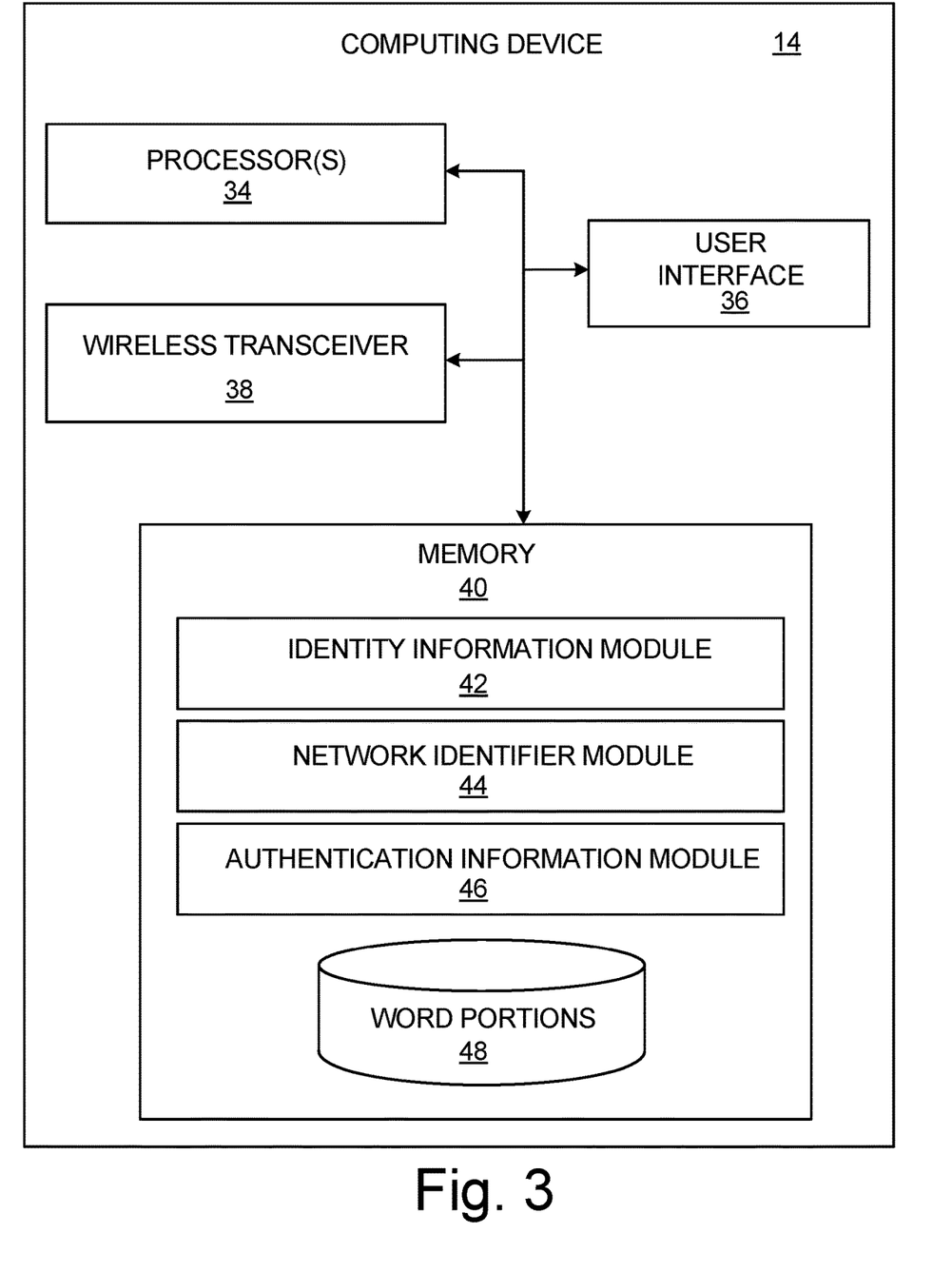
FIG. 3 is a block diagram illustrating further details of the computing device of FIG. 1.

FIG. 3 is a block diagram illustrating further details of computing device 14 of FIG. 1, which can be a laptop computer, a tablet computer, a smartphone, or other portable or non-portable computing device capable of generating network identifier and authentication information for communicating wirelessly with BAS controllers 12A-12N (FIG. 1). As illustrated in FIG. 3, computing device 14 can include one or more processors 34, user interface 36, wireless transceiver 38, and computer-readable memory 40.

As was similarly described above with respect to processor 18 of BAS controller 12A (FIG. 2), processor 34 can be configured to implement functionality and/or process instructions for execution within computing device 14. Examples of processor 34 can include any one or more of a microprocessor, a digital signal processor (DSP), an application specific integrated circuit (ASIC), a field-programmable gate array (FPGA), or other equivalent discrete or integrated logic circuitry.

Computing device 14 utilizes user interface 36 for receiving input from and outputting information to a user, such as a service engineer or other user. User interface 36 can include physical and/or graphical control elements that enable user input to interact with computing device 14. For instance, user interface 36 can take the form of a graphical user interface (GUI) that presents graphical control elements at, e.g., a display device of user interface 36. In certain examples, computing device 14 can present the GUI at a touch-sensitive and/or presence sensitive display screen to receive user input in the form of gestures, such as touch gestures, scroll gestures, zoom gestures or other gesture input. In certain examples, user interface 36 can include a physical keyboard, a mouse, physical buttons, keys, knobs, or other physical control elements configured to receive user input to interact with computing device 14.

Computing device 14 utilizes wireless transceiver 38 for communicating with external devices via wireless communication, such as for wirelessly communicating with BAS controllers 12A-12N (FIG. 1). Computer-readable memory 40 of computing device 14 can be substantially similar to computer-readable memory 24 of BAS controller 12A (FIG. 2). That is, computer-readable memory 40 can be configured to store information within computing device 14, and can include volatile and non-volatile memory elements.

As illustrated in FIG. 3, computer-readable memory 40 stores identity information module 42, network identifier module 44, authentication information module 46, and word portions 48. Modules 42, 44, and 46, as well as word portions 48 are coordinated with identity information module 26, network identifier module 28, authentication module 30, and word portions 32 of BAS controller 12A to produce network identity and authentication information that is substantially the same as the network identity and authentication information produced by BAS controller 12A for initiating a wireless communication session. That is, while modules 42, 44, and 46 of computing device 14 can, in some examples, represent computer-readable instructions that are the same as those represented by modules 26, 28, and 30 of BAS controller 12A, modules 42, 44, and 46 of computing device 14 and modules 26, 28, and 30 need not represent identical computer-readable instructions in all examples. For instance, modules 42, 44, and 46 of computing device 14 can be implemented using a different software language having a different syntax than the software language implemented for producing modules 26, 28, and 30 of BAS controller 12A. In addition, modules 42, 44, and 46 can be implemented using a different software architecture that results in a different order of instructions and/or different data storage techniques than those represented by modules 26, 28, and 30 of BAS controller 12A. Similarly, word portions 48 can be stored in the form of a different data structure than that of word portions 32 of BAS controller 12A. In general, though modules 42, 44, and 46, as well as word portions 48 of computing device 14 can be different than modules 26, 28, and 30, as well as word portions 32 of BAS controller 12A, the operations of modules 42, 44, and 46 as well as the data storage techniques of word portions 48 are coordinated with modules 26, 28, and 30 as well as the data storage techniques of word portions 32 of BAS controller 12A, to produce corresponding (e.g., matching) network identity information and authentication information using identity information of BAS controller 12A that is received by computing device 14 via wireless transceiver 38.

Accordingly, computing device 14 can generate network identifier information and authentication information that is usable for initiating a wireless communication session with any one or more of BAS controllers 12A-12N without requiring a wired connection to initiate or otherwise configure BAS controllers 12A-12N for wireless communications. Computing device 14, implementing techniques of this disclosure, can therefore help to decrease the amount of time and/or number of service engineers that are utilized for commissioning a BAS system.

Figure 4:
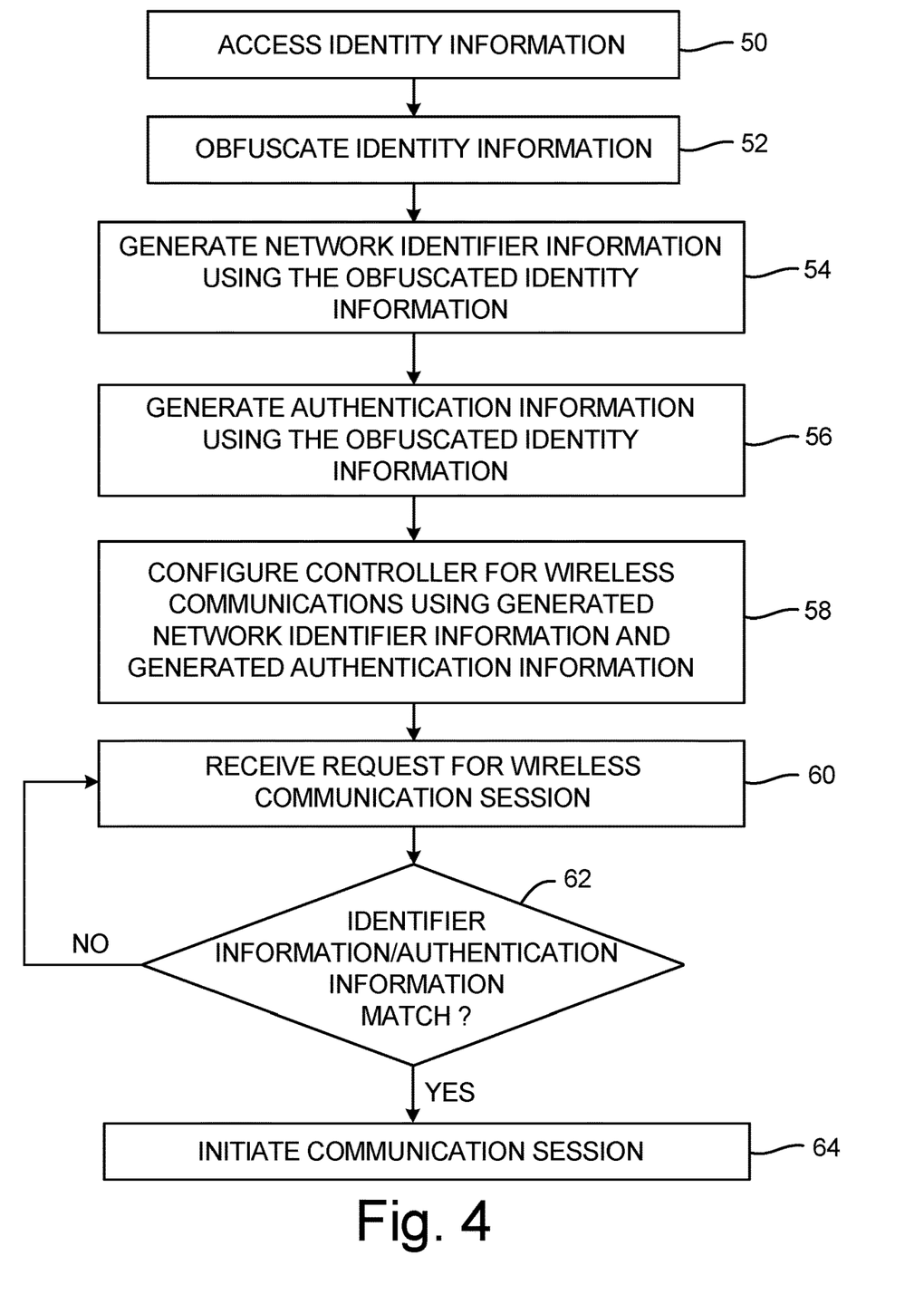
FIG. 4 is a flow diagram illustrating example operations for generating network identifier and authentication information for a controller and initiating a wireless communication session between the controller and a remote computing device.

FIG. 4 is a flow diagram illustrating example operations for generating network identifier and authentication information for a BAS controller and initiating a wireless communication session between the BAS controller and a remote computing device. For purposes of clarity and ease of discussion, the example operations are described below within the context of BAS system 10 (FIG. 1) as well as BAS controller 12A (FIGS. 1 and 2) and computing device 14 (FIGS. 1 and 3). Though the example operations are described below with respect to BAS controller 12A, it should be understood that the example operations are applicable to any one or more of BAS controllers 12A-12N (FIG. 1).

BAS controller 12A accesses identity information associated with BAS controller 12A (Step 50). For example, processor 18 can execute identity information module 26 to access identity information associated with BAS controller 12A. The identity information can include, e.g., a MAC address of BAS controller 12A, a MAC address of a wireless transceiver of BAS controller 12A (e.g., a wireless transceiver of wireless communication interface 22), a MAC address of a wireless communication adapter associated with BAS controller 12A (e.g., wireless communication adapter 16 connected with BAS controller 12A via I/O ports 20), or other identity information associated with BAS controller 12A.

BAS controller 12A obfuscates the identity information to produce obfuscated identity information associated with BAS controller 12A (Step 52). For instance, processor 18 can execute identity information module 26 to obfuscate the identity information using a cryptographic hash function or other obfuscation technique. Example cryptographic hash functions can include, but are not limited to, the MD5 message-digest algorithm, the SHA-256 Secure Hash Algorithm, the SHA-512 Secure Hash Algorithm, the PBKDF2 Password-Based Key Derivation Function 2 algorithm, or other cryptographic algorithms known in the art.

BAS controller 12A generates network identifier information associated with BAS controller 12A using the obfuscated identity information (Step 54). For example, BAS controller 12A can generate the network identifier information, such as an SSID, as a combination (e.g., concatenation or other combination) of an identifier word portion and an identifier numeric portion that are determined using the obfuscated identity information, as is further described below.

BAS controller 12A generates authentication information associated with BAS controller 12A using the obfuscated identity information (Step 56). For instance, BAS controller 12A can generate the authentication information, such as a password, as a combination (e.g., concatenation or other combination) of an authentication word portion and an authentication numeric portion, as is further described below.

BAS controller 12A configures wireless communication interface 22 for wireless communication using the generated network identifier information and the generated authentication information (Step 58). For example, BAS controller 12A can configure wireless communication interface 22 for wireless communication using an SSID generated as the network identity information and a corresponding password generated as the network authentication information.

BAS controller 12A can receive a request for initiating a wireless communication session (Step 60). For instance, BAS controller 12A can receive a request from computing device 14 to initiate a wireless communication session, the request including network identity information (e.g., an SSID) and authentication information (e.g., a password).

BAS controller 12A can determine whether the network identifier information and authentication information received via the request corresponds to (e.g., matches) the network identifier information and authentication information generated by BAS controller 12A (Step 62). In response to determining that the network identifier information and authentication information received via the request does not correspond to (e.g., match) the network identifier information and authentication information generated by BAS controller 12A ("NO" branch of Step 62), BAS controller 12A can continue to receive requests for wireless communication sessions (Step 60).

In response to determining that the network identifier information and authentication information received via the request corresponds to (e.g., matches) the network identifier information and authentication information generated by BAS controller 12A ("YES" branch of Step 62), BAS controller 12A can initiate a wireless communication session with the remote computing device (e.g., computing device 14). Accordingly, BAS controller 12A can initiate a wireless communication session with a remote computing device for configuration and commissioning of BAS controller 12A without requiring a wired connection for initializing the wireless communications.

Figure 5:
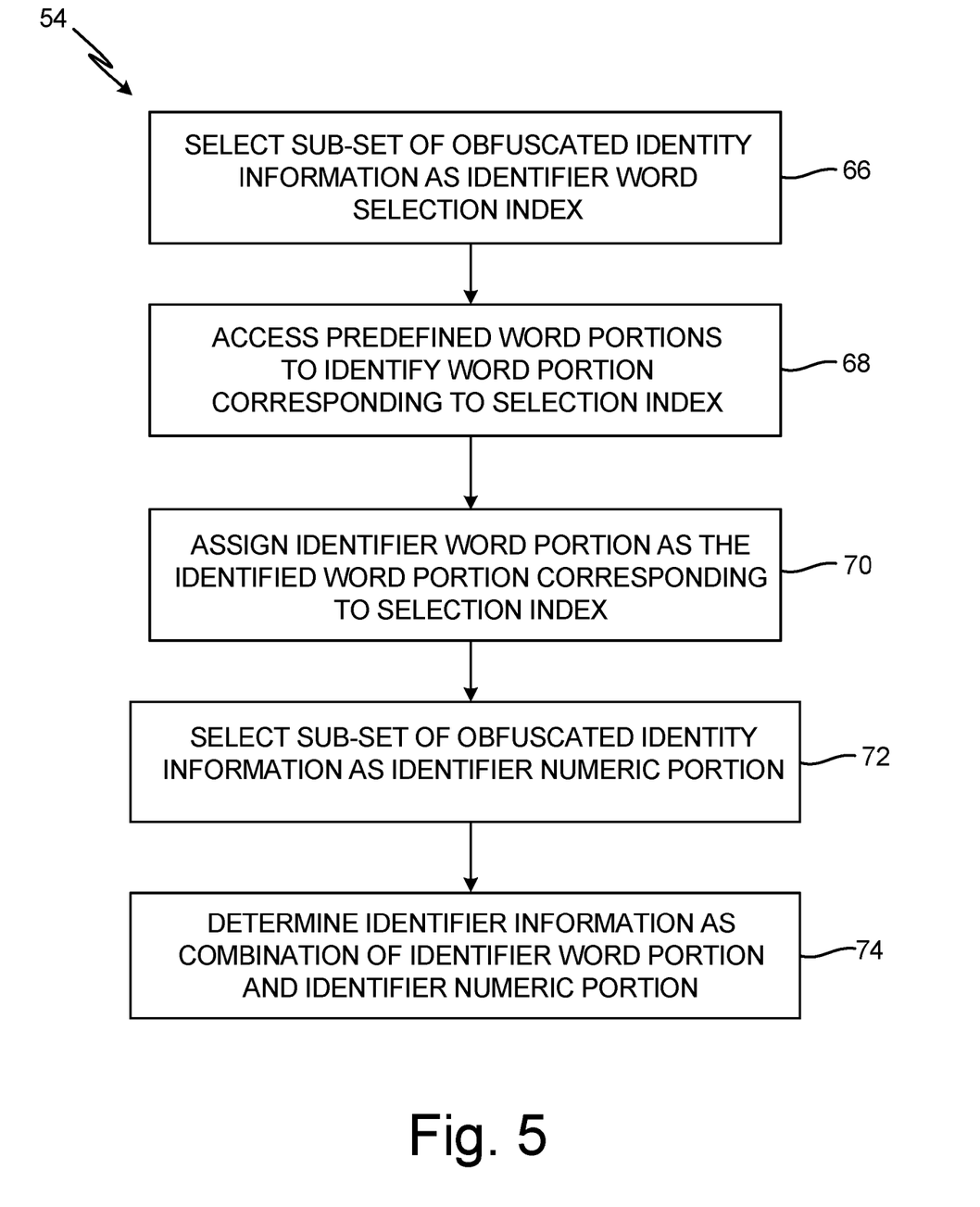
FIG. 5 is a flow diagram illustrating example operations of the controller to generate the network identifier information.

FIG. 5 is a flow diagram illustrating further details of Step 54 of FIG. 4 to generate network identifier information using obfuscated identity information. Though the example operations are described below with respect to BAS controller 12A, it should be understood that the example operations are applicable to any one or more of BAS controllers 12A-12N (FIG. 1).

As illustrated in FIG. 5, generating the network identifier information can include selecting a sub-set of the obfuscated identity information of BAS controller 12A as an identifier word selection index (Step 66). As an example, BAS controller 12A can generate the obfuscated identity information by applying a cryptographic hash function, such as the MD5 message-digest algorithm, to identity information associated with BAS controller 12A to produce, e.g., a 128-bit hash number representing the obfuscated identity information associated with BAS controller 12A. In some examples, such as those examples in which the applied cryptographic hash function produces a non-decimal (or non-integer) output (e.g., a hexadecimal output or other non-decimal or non-integer output), BAS controller 12A can convert the produced hash number to decimal (or integer) format. BAS controller 12A can select a sub-set of the, e.g., decimal-format obfuscated identity information for use as an identifier word selection index that is utilized for accessing word portions 32 to select and assign a word portion of the network identity information.

For example, BAS controller 12A can select a sub-set of the obfuscated identity information by applying a modulo operation to the decimal-format obfuscated identity information to select a sub-set of the obfuscated identity information, the sub-set being the remainder of the decimal-format obfuscated identity information after division by a defined divisor (i.e., the modulus of operation). BAS controller 12A can utilize the sub-set of the obfuscated identity information produced via the modulo operation as an identifier word selection index that is used to select and assign an identifier word portion of the network identity information. In some examples, the divisor can correspond to a number of word portions stored at word portions 32. For instance, in examples where word portions 32 stores one hundred separate word portions that can be selected as word portions of the network identity information, BAS controller 12A can utilize a divisor of one hundred to select the sub-set of the obfuscated identity information, thereby producing an identifier word selection index that ranges between a numerical value of zero and a numerical value of ninety-nine, each possible identifier word selection index therefore uniquely corresponding to one of the possible word portions stored at word portions 32. In other examples, such as when word portions 32 stores one thousand separate word portions, BAS controller 12A can utilize a divisor of one thousand to select the sub-set of the obfuscated identity information, though other even or non-even numbers of stored word portions and divisors are contemplated.

In some examples, BAS controller 12A can select a sub-set of the obfuscated identity information by selecting a defined number and location of digits of the obfuscated identity information. For instance, BAS controller 12A can select one, two, three, four, or more digits of the obfuscated identity information from defined locations of the obfuscated identity information, such as the most significant digit (or digits), the least significant digit (or digits), or any one or more other consecutive or non-consecutive digits of the obfuscated identity information.

In certain examples, BAS controller 12A can reduce a size of the obfuscated identity information prior to selecting the sub-set of the obfuscated identity information as the identifier word selection index. Such size reduction operations can include, e.g., an Exclusive OR (XOR) operation of the upper half of the bits of the obfuscated identity information (i.e., the upper half corresponding to the most significant bits) with the lower half of the bits of the obfuscated identity information (i.e., the lower half corresponding to the least significant bits) to reduce the size of the obfuscated identity information by half. In other examples, such size reduction techniques can include the selection of a portion of the obfuscated identity information, such as an upper threshold number of bits, a lower threshold number of bits, or other size reduction techniques. In general, BAS controller 12A can select any sub-set of the obfuscated identity information for use as an identifier word selection index that is used to select and assign one of a group of word portions stored at word portions 32 as an identifier word portion of the network identity information associated with BAS controller 12A.

BAS controller 12A accesses a group of predefined word portions stored at word portions 32 to identify one of the group of predefined word portions associated with the identifier word selection index (Step 68). For example, BAS controller 12A can access a list, a table, or other data structure stored at word portions 32 to identify one of the predefined word portions associated with the identifier word selection index, such as an index having a numerical value of sixty-six, or other numerical value. Predefined word portions stored at word portions 32 can, in some examples, include strings of only textual characters. In other examples, predefined word portions stored at word portions 32 can include strings of alphanumeric characters (i.e., both numeral and textual characters).

BAS controller 12A assigns the identifier word portion for use in generating the network identity information as the identified word portion corresponding to the identifier word selection index (Step 70). For instance, BAS controller 12A can identify that the word portion corresponding to an identifier word selection index having a numerical value of sixty-six as the string of textual characters "IceBox", though other strings of textual or alphanumeric characters are possible. BAS controller 12A, in such an example, assigns the identifier word portion for use in generating the network identity information as the string of textual characters "IceBox".

BAS controller 12A selects a sub-set of the obfuscated identity information as an identifier numeric portion for use in generating the network identity information (Step 72). For example, BAS controller 12A can apply a modulo operation to the decimal-format obfuscated identity information (or the reduced-size decimal-format obfuscated identity information) to select a sub-set of the obfuscated identity information. The divisor utilized for selecting the sub-set via the modulo operation can be, e.g., a number having a value of ten, one hundred, one thousand, ten thousand, or other even or non-even divisor. For instance, BAS controller 12A can apply a modulo operation using a divisor having a numerical value of ten thousand to reduced-size obfuscated identity information having a value of 89373625512994595466 to produce an identifier numeric portion having a numerical value of 5466. In other examples, BAS controller 12A can select a sub-set of digits (i.e., without using the modulo operation) of the obfuscated identity information (or the reduced-size obfuscated identity information) as the identifier numeric portion, such as one or more of the most significant digit (or digits), one or more of the least significant digit (or digits), or any one or more other consecutive or non-consecutive digits of the obfuscated identity information (or reduced-size obfuscated identity information).

BAS controller 12A determines the network identifier information associated with BAS controller 12A as a combination of the identifier word portion and the identifier numeric portion (Step 74). For example, BAS controller 12A can concatenate the identifier word portion and the identifier numeric portion to produce the network identifier information. For instance, BAS controller 12A can concatenate a determined identifier word portion of "IceBox" with a determined identifier numeric portion of "5466" to produce the network identifier information as "IceBox5466", though in other examples BAS controller 12A can concatenate the identifier word portion and the identifier numeric portion in an opposite order (e.g., "5466IceBox").

As such, BAS controller 12A can generate network identity information that is derived from obfuscated identity information associated with BAS controller 12A. BAS controller 12A can configure a wireless communication interface for wireless communication using the network identity information, such as by designating the generated network identity information as an SSID associated with BAS controller 12A.

Figure 6:
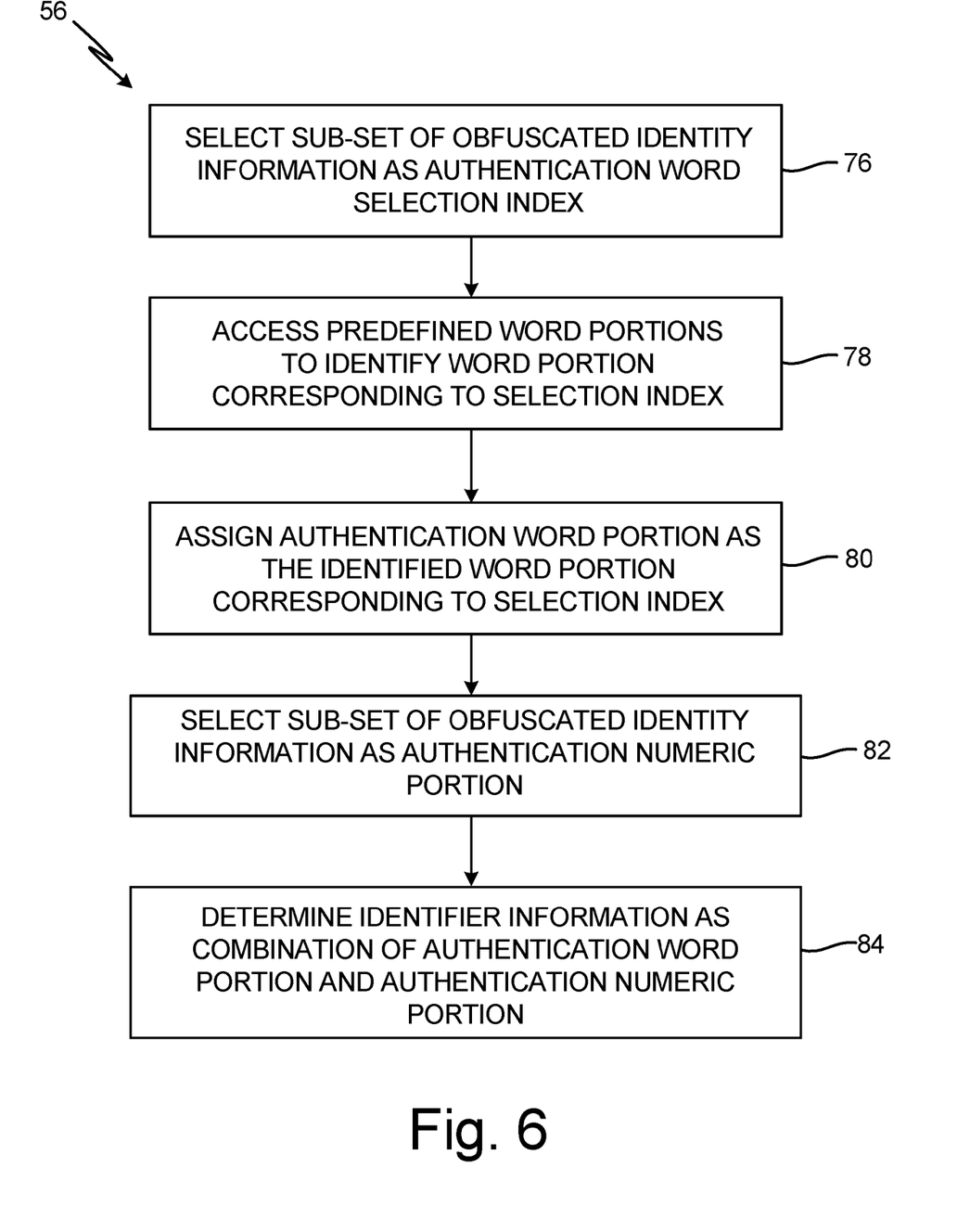
FIG. 6 is a flow diagram illustrating example operations of the controller to generate the authentication information.

FIG. 6 is a flow diagram illustrating further details of Step 56 of FIG. 4 to generate authentication information using obfuscated identity information. Though the example operations are described below with respect to BAS controller 12A, it should be understood that the example operations described below are applicable to any one or more of BAS controllers 12A-12N (FIG. 1).

As illustrated in FIG. 6, generating the authentication information can include selecting a sub-set of the obfuscated identity information as an authentication word selection index (Step 76). For instance, BAS controller 12A can select a sub-set of the obfuscated identity information by applying a modulo operation to a decimal-format obfuscated identity information (or reduced-size obfuscated identity information) to select a sub-set of the obfuscated identity information. In some examples, BAS controller 12A can select a sub-set of the digits of the obfuscated or reduced-size obfuscated identity information (i.e., without using the modulo operation) to determine the authentication word selection index, such as one or more of the most significant digit (or digits), one or more of the least significant digit (or digits), or any one or more other consecutive or non-consecutive digits of the obfuscated identity information (or reduced-size obfuscated identity information).

In certain examples, BAS controller 12A can further reduce the size of the reduced-size obfuscated identity information to produce further reduced-size obfuscated identity information from which the sub-set of the digits is selected as the authentication word selection index. For instance, BAS controller 12A can perform an Exclusive OR (XOR) operation on the upper half of the bits of the reduced-size obfuscated identity information with the lower half of the bits of the reduced-size obfuscated identity information to further reduce the size of the reduced-size obfuscated identity information by half. In other examples, such further reduction in the size of the reduced-size obfuscated identity information can include the selection of a portion of the reduced-size obfuscated identity information, such as an upper threshold number of bits, a lower threshold number of bits, or other size reduction techniques to further reduce the size of the reduced-size obfuscated identity information.

BAS controller 12A can access a group of word portions stored at, e.g., word portions 32, to identify one of the group of predefined word portions associated with the authentication word selection index (Step 78), and can assign the authentication word portion as the identified word portion corresponding to the selection index (Step 80). For instance, BAS controller 12A can store, at word portions 32, a separate group of predefined word portions that can be utilized for determining the authentication word portion. In other examples, BAS controller 12A can utilize the same group of predefined word portions for both the selection of the identifier word portion and the authentication word portion. In yet other examples, BAS controller 12A can utilize the determined identifier word portion as the authentication word portion (e.g., "IceBox" in the above example). That is, in some examples, BAS controller 12A need not perform Steps 76 and 78 to generate an authentication word portion, but rather may utilize the identifier word portion as the authentication word portion.

BAS controller 12A selects a sub-set of the obfuscated identity information as an authentication numeric portion for use in generating the network identity information (Step 82). For example, BAS controller 12A can apply a modulo operation to the decimal-format obfuscated identity information (or the reduced-size or further reduced-size decimal-format obfuscated identity information) to select a sub-set of the obfuscated identity information. The utilized divisor for the modulo operation can be, e.g., a number having a value of one, ten, one hundred, one thousand, ten thousand, or other even or non-even divisor. In other examples, BAS controller 12A can select a sub-set of digits (i.e., without using the modulo operation) of the obfuscated identity information (or the reduced-size or further reduced-size obfuscated identity information) as the authentication numeric portion, such as one or more of the most significant digit (or digits), one or more of the least significant digit (or digits), or any one or more other consecutive or non-consecutive digits of the obfuscated identity information (or reduced-size or further reduced-size obfuscated identity information).

BAS controller 12A determines the authentication information associated with BAS controller 12A as a combination of the authentication word portion and the authentication numeric portion (Step 84). For example, BAS controller 12A can concatenate or otherwise combine the authentication word portion and the authentication numeric portion to produce the authentication information.

As such, BAS controller 12A can generate authentication information that is derived from obfuscated identity information associated with BAS controller 12A. BAS controller 12A can configure a wireless communication interface for wireless communication using the authentication information, such as by designating the generated authentication information as a password associated with the generated network identity information (e.g., SSID).

Figure 7:
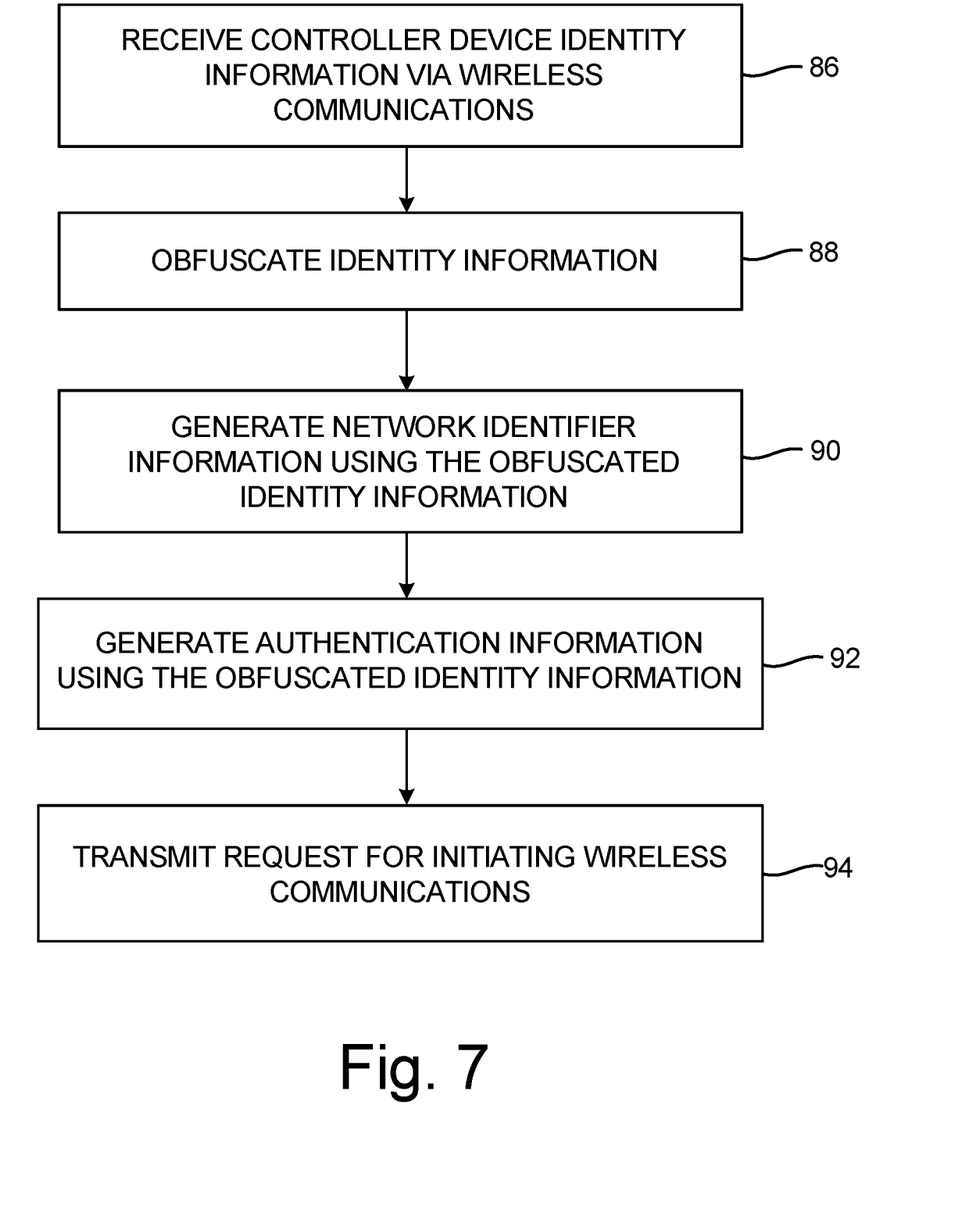
FIG. 7 is a flow diagram illustrating example operations of a remote computing device to generate the network identifier and authentication information and to transmit a request for initiating a wireless communication session with the controller.

FIG. 7 is a flow diagram illustrating example operations of computing device 14 (FIGS. 1 and 3) to generate network identifier and authentication information and to transmit a request for initiating a wireless communication session with BAS controller 12A (FIGS. 1 and 2). Though the example operations are described below with respect to initiating a wireless communication session with BAS controller 12A, it should be understood that the example operations are applicable to requests for initiating wireless communication with any one or more of BAS controllers 12A-12N (FIG. 1).

As illustrated in FIG. 7, computing device 14 can receive identity information associated with BAS controller 12A via wireless communication (Step 86). For example, BAS controller 12A can wirelessly broadcast identity information associated with BAS controller 12A (e.g., a MAC address associated with BAS controller 12A).

Computing device 14 obfuscates the received identity information associated with BAS controller 12A (Step 88). For instance, computing device 14, as was described above, can perform obfuscation operations that are coordinated with obfuscation operations performed by BAS controller 12A to generate obfuscated identity information associated with BAS controller 12A. For instance, computing device 14 can be configured (e.g., via an application or other software routine) to apply a same cryptographic hash function or other obfuscation technique to the identity information as was applied by BAS controller 12A to the identity information to arrive at the same (e.g., matching) obfuscated identity information associated with BAS controller 12A.

Computing device 14 generates network identifier information using the obfuscated identity information (Step 90) and generates authentication information using the obfuscated identity information (Step 92). For instance, computing device 14 can perform the same or equivalent operations as are performed by BAS controller 12A to generate the network identifier information (e.g., Steps 66, 68, 70, 72, and 74 of FIG. 5) and to generate the authentication information (e.g., Steps 76, 78, 80, 82, and 84 of FIG. 6) associated with BAS controller 12A.

Computing device 14 transmits a request for initiating a wireless communication session with BAS controller 12A (Step 94). For example, computing device 14 can transmit a request for initiating a wireless communication session with BAS controller 12A that includes the network identifier information (e.g., SSID) and authentication information (e.g., password) that was derived from the obfuscated identity information associated with BAS controller 12A.

Accordingly, computing device 14 can generate corresponding (e.g., matching) network identifier information and authentication information using corresponding (e.g., matching) obfuscated identity information as was generated by BAS controller 12A using identity information associated with BAS controller 12A. Computing device 14 can therefore transmit a request for initiating a wireless communication session with BAS controller 12A using the generated network identifier information and authentication information that can be verified and authenticated by BAS controller 12A prior to establishing the wireless communication session.

Techniques of this disclosure can therefore enable secure wireless communication sessions between a remote computing device utilized by, e.g., a service engineer or other technician, and any one or more BAS controllers without requiring a wired connection for the initialization and configuration of the wireless communication. The techniques described herein can therefore decrease the amount of time spent by service engineers or other technicians (and, in some cases, the number of deployed service engineers or other technicians) to configure and commission a BAS system, thereby decreasing the total cost associated with commissioning and maintenance operations.

Discussion of Possible Embodiments

The following are non-exclusive descriptions of possible embodiments of the present invention.

A method for generating network identifier information and authentication information for wireless communication with a controller includes accessing, by the controller, identity information associated with the controller. The method further includes obfuscating, by the controller, the identity information to produce obfuscated identity information associated with the controller, and generating, by the controller, the network identifier information and the authentication information associated with the controller using the obfuscated identity information. The method further includes configuring the controller for wireless communication using the generated network identifier information and the generated authentication information.

The method of the preceding paragraph can optionally include, additionally and/or alternatively, any one or more of the following features, configurations, operations, and/or additional components:

Obfuscating the identity information can include obfuscating the identity information associated with the controller using a cryptographic hash function to produce the obfuscated identity information.

The identity information associated with the controller can include a media access control (MAC) address associated with the controller.

The MAC address associated with the controller can include a MAC address of the controller.

The MAC address associated with the controller can include a MAC address of a wireless transceiver of the controller.

The MAC address associated with the controller can include a MAC address of a removable wireless adapter associated with the controller.

Generating the network identifier information associated with the controller using the obfuscated identity information can include generating the network identifier information as a combination of an identifier word portion assigned based on the obfuscated identity information and an identifier numeric portion derived from the obfuscated identity information.

Generating the network identifier information as the combination of the identifier word portion and the identifier numeric portion can include selecting a sub-set of the obfuscated identity information as a word selection index.

Generating the network identifier information as the combination of the identifier word portion and the identifier numeric portion can include accessing a group of predefined word portions stored by the controller to identify one of the group of predefined word portions associated with the word selection index.

Generating the network identifier information as the combination of the identifier word portion and the identifier numeric portion can include assigning the identifier word portion of the network identifier information as the identified one of the group of predefined word portions associated with the word selection index.

Generating the network identifier information as the combination of the identifier word portion and the identifier numeric portion can include deriving the identifier numeric portion as a selected sub-set of the obfuscated identity information.

Generating the authentication information associated with the controller using the obfuscated identity information can include generating the authentication information as a combination of an authentication word portion assigned based on the obfuscated identity information and an authentication numeric portion derived from the obfuscated identity information.

Generating the authentication information as the combination of the authentication word portion and the authentication numeric portion can include selecting a sub-set of the obfuscated identity information as a word selection index.

Generating the authentication information as the combination of the authentication word portion and the authentication numeric portion can include accessing a group of predefined word portions stored by the controller to identify one of the group of predefined word portions associated with the word selection index.

Generating the authentication information as the combination of the authentication word portion and the authentication numeric portion can include assigning the authentication word portion of the network identifier information as the identified one of the group of predefined word portions associated with the word selection index.

Generating the authentication information as the combination of the authentication word portion and the authentication numeric portion can include deriving the authentication numeric portion as a selected sub-set of the obfuscated identity information.

Generating the network identifier information and the authentication information associated with the controller using the obfuscated identity information can include reducing a size of the obfuscated identity information to produce reduced obfuscated identity information.

Generating the network identifier information and the authentication information associated with the controller using the obfuscated identity information can include generating the network identifier information and the authentication information associated with the controller based on the reduced obfuscated identity information.

The method can further include receiving, by the controller from a remote computing device, a request for initiating a wireless communication session between the controller and the remote computing device.

The method can further include initiating, by the controller, the wireless communication session between the controller and the remote computing device in response to determining that network identifier information and authentication information included in the request matches the generated network identifier information and the generated authentication information of the controller.

The network identifier information can include a service set identifier (SSID).

The authentication information can include a password.

A method for generating network identifier information and authentication information for wireless communication with a controller includes receiving, by a computing device via wireless communication, identity information associated with the controller. The method further includes obfuscating, by the computing device, the identity information to produce obfuscated identity information associated with the controller, and generating, by the computing device, the network identifier information and the authentication information associated with the controller using the obfuscated identity information. The method further includes transmitting, by the computing device via the wireless communication, a request for initiating a wireless communication session between the computing device and the controller, the request including the generated network identifier information and the generated authentication information associated with the controller.

The method of the preceding paragraph can optionally include, additionally and/or alternatively, any one or more of the following features, configurations, operations, and/or additional components:

The identity information associated with the controller can include a media access control (MAC) address associated with the controller.

Generating the network identifier information associated with the controller using the obfuscated identity information can include generating the network identifier information as a combination of an identifier word portion assigned based on the obfuscated identity information and an identifier numeric portion derived from the obfuscated identity information.

A controller device includes a wireless communication interface, one or more processors, and computer-readable memory. The computer-readable memory is encoded with instructions that, when executed by the one or more processors, cause the controller device to access identity information associated with the controller device, and obfuscate the identity information to produce obfuscated identity information associated with the controller device. The computer-readable memory is further encoded with instructions that, when executed by the one or more processors, cause the controller device to generate network identifier information and authentication information associated with the controller device using the obfuscated identity information, and configure the wireless communication interface for a wireless communication session using the generated network identifier information and the generated authentication information.

The controller device of the preceding paragraph can optionally include, additionally and/or alternatively, any one or more of the following features, configurations, operations, and/or additional components:

The wireless communication interface can be configured to interface with a wireless transceiver of the controller device.

The wireless communication interface can be configured to interface with a removable wireless adapter connected to the controller device.

The computer-readable memory can be further encoded with instructions that, when executed by the one or more processors, cause the controller device to obfuscate the identity information associated with the controller device using a cryptographic hash function to produce the obfuscated identity information.

The identity information associated with the controller device can include a media access control (MAC) address associated with the controller.

The generated network identifier information can include a service set identifier (SSID).

The authentication information can include a password.

The computer-readable memory can be further encoded with instructions that, when executed by the one or more processors, cause the controller device to generate the SSID using the obfuscated MAC address associated with the controller device as a combination of an identifier word portion assigned based on the obfuscated MAC address and an identifier numeric portion derived from the obfuscated MAC address.

The computer-readable memory can be further encoded with instructions that, when executed by the one or more processors, cause the controller device to generate the password using the obfuscated MAC address associated with the controller device as a combination of an authentication word portion assigned based on the obfuscated MAC address and an authentication numeric portion derived from the obfuscated MAC address.

A system can include the controller device and a computing device that is remote from the controller device. The computing device can include a wireless transceiver, one or more processors, and computer-readable memory. The computer-readable memory can be encoded with instructions that, when executed by the one or more processors, cause the computing device to receive, via the wireless transceiver, the identity information associated with the controller device, and obfuscate the identity information to produce the obfuscated identity information associated with the controller device. The computer-readable memory can be further encoded with instructions that, when executed by the one or more processors, cause the computing device to generate the network identifier information and the authentication information associated with the controller device using the obfuscated identity information, and transmit, via the wireless transceiver, a request for initiating the wireless communication session. The request can include the generated network identifier information and the generated authentication information associated with the controller device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for generating network identifier information and authentication information for wireless communication with a controller, the method comprising:

accessing, by the controller, identity information associated with the controller;

obfuscating, by the controller, the identity information to produce obfuscated identity information associated with the controller;

generating, by the controller, the network identifier information and the authentication information associated with the controller using the obfuscated identity information, wherein generating the network identifier information associated with the controller using the obfuscated identity information comprises generating the network identifier information as a combination of an identifier word portion assigned based on the obfuscated identity information and an identifier numeric portion derived from the obfuscated identity information; and configuring the controller for wireless communication using the generated network identifier information and the generated authentication information.

2. The method of claim 1,
wherein obfuscating the identity information comprises obfuscating the identity information associated with the controller using a cryptographic hash function to produce the obfuscated identity information.

3. The method of claim 1,
wherein the identity information associated with the controller comprises a media access control (MAC) address associated with the controller.

4. The method of claim 3,
wherein the MAC address associated with the controller comprises one of a MAC address of the controller, a MAC address of a wireless transceiver of the controller, and a MAC address of a removable wireless adapter associated with the controller.

5. The method of claim 1,
wherein generating the network identifier information as the combination of the identifier word portion and the identifier numeric portion comprises:
selecting a sub-set of the obfuscated identity information as a word selection index;
accessing a group of predefined word portions stored by the controller to identify one of the group of predefined word portions associated with the word selection index; and
assigning the identifier word portion of the network identifier information as the identified one of the group of predefined word portions associated with the word selection index.

6. The method of claim 1,
wherein generating the network identifier information as the combination of the identifier word portion and the identifier numeric portion comprises:
deriving the identifier numeric portion as a selected sub-set of the obfuscated identity information.

7. The method of claim 1,
wherein generating the authentication information associated with the controller using the obfuscated identity information comprises generating the authentication information as a combination of an authentication word portion assigned based on the obfuscated identity information and an authentication numeric portion derived from the obfuscated identity information.

8. The method of claim 7,
wherein generating the authentication information as the combination of the authentication word portion and the authentication numeric portion comprises:
selecting a sub-set of the obfuscated identity information as a word selection index;
accessing a group of predefined word portions stored by the controller to identify one of the group of predefined word portions associated with the word selection index; and
assigning the authentication word portion of the network identifier information as the identified one of the group of predefined word portions associated with the word selection index.

9. The method of claim 7,
wherein generating the authentication information as the combination of the authentication word portion and the authentication numeric portion comprises:
deriving the authentication numeric portion as a selected sub-set of the obfuscated identity information.

10. The method of claim 1,
wherein generating the network identifier information and the authentication information associated with the controller using the obfuscated identity information comprises:
reducing a size of the obfuscated identity information to produce reduced obfuscated identity information; and
generating the network identifier information and the authentication information associated with the controller based on the reduced obfuscated identity information.

11. The method of claim 1, further comprising:
receiving, by the controller from a remote computing device, a request for initiating a wireless communication session between the controller and the remote computing device;
initiating, by the controller, the wireless communication session between the controller and the remote computing device in response to determining that network identifier information and authentication information included in the request matches the generated network identifier information and the generated authentication information of the controller.

12. The method of claim 1,
wherein the network identifier information comprises a service set identifier (SSID); and
wherein the authentication information comprises a password.

13. A method for generating network identifier information and authentication information for wireless communication with a controller, the method comprising:
receiving, by a computing device via wireless communication, identity information associated with the controller, the identify information associated with the controller comprising a media access control (MAC) address associated with the controller;
obfuscating, by the computing device, the identity information to produce obfuscated identity information associated with the controller;
generating, by the computing device, the network identifier information and the authentication information associated with the controller using the obfuscated identity information; and
transmitting, by the computing device via the wireless communication, a request for initiating a wireless communication session between the computing device and the controller, the request including the generated network identifier information and the generated authentication information associated with the controller;
wherein generating the network identifier information associated with the controller using the obfuscated identity information comprises generating the network identifier information as a combination of an identifier word portion assigned based on the obfuscated identity information and an identifier numeric portion derived from the obfuscated identity information.

14. A controller device comprising:
a wireless communication interface;
one or more processors; and
computer-readable memory encoded with instructions that, when executed by the one or more processors, cause the controller device to:
  access identity information associated with the controller device;
  obfuscate the identity information to produce obfuscated identity information associated with the controller device;
  generate network identifier information and authentication information associated with the controller device using the obfuscated identity information; and
  configure the wireless communication interface for a wireless communication session using the generated network identifier information and the generated authentication information;
wherein the identity information associated with the controller device comprises a media access control (MAC) address associated with the controller;
wherein the generated network identifier information comprises a service set identifier (SSID);
wherein the authentication information comprises a password; and
wherein the computer-readable memory is further encoded with instructions that, when executed by the one or more processors, cause the controller device to:
  generate the SSID using the obfuscated MAC address associated with the controller device as a combination of an identifier word portion assigned based on the obfuscated MAC address and an identifier numeric portion derived from the obfuscated MAC address; and
  generate the password using the obfuscated MAC address associated with the controller device as a combination of an authentication word portion assigned based on the obfuscated MAC address and an authentication numeric portion derived from the obfuscated MAC address.

15. The controller device of claim 14, wherein the wireless communication interface is configured to interface with one or more of a wireless transceiver of the controller device and a removable wireless adapter connected to the controller device.

16. The controller device of claim 14, wherein the computer-readable memory is further encoded with instructions that, when executed by the one or more processors, cause the controller device to:
  obfuscate the identity information associated with the controller device using a cryptographic hash function to produce the obfuscated identity information.

17. A system comprising:
the controller device of claim 14; and
a computing device that is remote from the controller device, the computing device comprising:
  a wireless transceiver;
  one or more processors; and
  computer-readable memory encoded with instructions that, when executed by the one or more processors of the computing device, cause the computing device to:
    receive, via the wireless transceiver, the identity information associated with the controller device;
    obfuscate the identity information to produce the obfuscated identity information associated with the controller device;
    generate the network identifier information and the authentication information associated with the controller device using the obfuscated identity information; and
    transmit, via the wireless transceiver, a request for initiating the wireless communication session, the request including the generated network identifier information and the generated authentication information associated with the controller device.

18. A method for generating network identifier information and authentication information for wireless communication with a controller, the method comprising:
  accessing, by the controller, identity information associated with the controller;
  obfuscating, by the controller, the identity information to produce obfuscated identity information associated with the controller;
  generating, by the controller, the network identifier information and the authentication information associated with the controller using the obfuscated identity information,
    wherein generating the authentication information associated with the controller using the obfuscated identity information comprises generating the authentication information as a combination of an authentication word portion assigned based on the obfuscated identity information and an authentication numeric portion derived from the obfuscated identity information; and
  configuring the controller for wireless communication using the generated network identifier information and the generated authentication information.

19. A method for generating network identifier information and authentication information for wireless communication with a controller, the method comprising:
  accessing, by the controller, identity information associated with the controller;
  obfuscating, by the controller, the identity information to produce obfuscated identity information associated with the controller;
  generating, by the controller, the network identifier information and the authentication information associated with the controller using the obfuscated identity information; and
  configuring the controller for wireless communication using the generated network identifier information and the generated authentication information;
wherein generating the network identifier information and the authentication information associated with the controller using the obfuscated identity information comprises:
  reducing a size of the obfuscated identity information to produce reduced obfuscated identity information; and
  generating the network identifier information and the authentication information associated with the controller based on the reduced obfuscated identity information.

* * * * *